United States Patent [19]

Schulz

[11] 4,052,173

[45] Oct. 4, 1977

[54] SIMULTANEOUS GASIFICATION OF COAL AND PYROLYSIS OF ORGANIC SOLID WASTE MATERIALS

[75] Inventor: Helmut W. Schulz, Harrison, N.Y.

[73] Assignee: Dynecology Incorporated, Harrison, N.Y.

[21] Appl. No.: 675,918

[22] Filed: Apr. 12, 1976

Related U.S. Application Data

[63] Continuation of Ser. No. 492,496, July 29, 1974, abandoned.

[51] Int. Cl.$^2$ .......................... C10J 3/08; C10J 3/16
[52] U.S. Cl. ...................................... 48/202; 48/206; 48/209; 252/373
[58] Field of Search ................. 48/197 A, 202, 206, 48/209, 87, 86 A, 197 R; 252/373; 201/21

[56] References Cited

U.S. PATENT DOCUMENTS

| 475,203 | 5/1892 | Colton | 48/86 A |
|---|---|---|---|
| 863,817 | 8/1907 | Whitman | 48/87 |
| 1,808,672 | 6/1931 | Lynn | 48/202 |
| 2,593,257 | 4/1952 | Bradley et al. | 48/202 |
| 3,511,194 | 5/1970 | Stookey | 48/209 |
| 3,820,964 | 6/1974 | Janka | 48/209 |
| 3,841,851 | 10/1974 | Kaiser | 48/209 |
| 3,926,582 | 12/1975 | Powell et al. | 48/209 |

*Primary Examiner*—S. Leon Bashore
*Assistant Examiner*—Peter F. Kratz
*Attorney, Agent, or Firm*—Vincent P. Pirri

[57] ABSTRACT

Gaseous fuels are produced by a process which involves simultaneous gasification of coal and pyrolysis of organic solid waste materials in a pollution-free conversion system. According to this process, a mixture of coal and organic solid waste materials is fed to the top of a reaction vessel such as a vertical shaft furnace or a blast furnace, wherein the feed is dried by heat exchange with the gases rising from the lower section of the reactor. Steam and an oxidant gas containing at least 75 volume percent oxygen are introduced to the bottom of the reactor for partially combusting coke and char in a partial combustion zone thereby providing the thermal driving force for the reactions in the reactor. The organic solid waste materials are pyrolyzed and the volatile components of the coal destructively distilled simultaneously in the presence of hydrogen in a pyrolysis and coking zone of the reactor wherein the organic solid waste materials are converted into char and the coal is converted into coke. The char and coke are reacted with oxygen and steam in the partial combustion zone. The descending inorganic materials are fused and the fused slag and molten metals are tapped from the bottom of the reactor. The gaseous products are removed from the top of the furnace and subjected to a product recovery section to remove the undesirable components. The ratio of hydrogen to carbon monoxide can be varied over a wide, commercially important range, by feeding secondary steam to a high temperature reaction zone intermediate the partial combustion zone and the pyrolysis and coking zone. Depending upon the ratio of hydrogen to carbon monoxide produced, the gaseous products can be used as fuel or as a synthesis gas for the production of methanol or methane.

Gaseous product containing larger quantities of methane may be produced by maintaining the reactor at elevated pressures during the process.

9 Claims, 4 Drawing Figures

SIMULTANEOUS GASIFICATION OF COAL AND PYROLYSIS OF ORGANIC SOLID WASTE MATERIALS

This is a continuation of Application Ser. No. 492,496, filed July 29, 1974 and now abandoned.

BACKGROUND OF THE INVENTION

This invention relates to the gasification of coal and pyrolysis of organic solid waste materials and, more particularly, it is related to the production of clean fuel gas, or a hydrogen-enriched synthesis gas for conversion to methanol or methane. More specifically, the present invention is concerned with the production of fuel gas, methanol, or methane as a source of energy, by the utilization of readily available raw materials such as coal and organic solid waste or agricultural refuse, which involves the simultaneous gasification of coal and organic solid waste components in a single reactor comprising a plurality of carefully controlled reaction zones designed to obtain a preselected ratio of hydrogen to carbon monoxide.

THE PRIOR ART

Today, approximately 200 million tons per year of mixed municipal refuse are generated in the United States. Most of this refuse (nearly 90%) is disposed of by open dumping and by sanitary landfill, while the remainder is disposed of by incineration. Open dumping and landfill disposal are unsightly and can be a source of considerable water pollution. Furthermore, most large urban centers are running out of available landfill sites, thus severely limiting such waste disposal methods. Incineration, on the other hand is a source of considerable atmospheric pollution. Efficient and complete removal of incinerator pollution requires the use of special pollution abatement devices which are costly and, therefore, economically disadvantageous in most industrial and municipal facilities. In addition to the aforesaid problems, these waste disposal methods fail to utilize the potential energy which is available in such municipal waste or refuse, and thus also represent a loss of energy resources.

The problems of efficient disposal of solid waste materials and their utilization as a source of energy have heretofore received the attention of some of the prior art workers in this area. Thus, for example, U.S. Pat. No. 3,403,643, issued to Fred Denig on Oct. 1, 1968, describes a method for incinerating municipal refuse with an oxygen-enriched gas (containing 20-50% oxygen) in a shaft furnace, thereby producing gaseous products which can be employed as a source of heat energy. Another patent, i.e., U.S. Pat. No. 3,729,298, issued to J. E. Anderson on Apr. 24, 1973, describes a method for pyrolyzing municipal solid waste by partial combustion with an oxygen-enriched air containing at least 40% oxygen, in a shaft furnace. In accordance with the method described by Anderson, a low heating value fuel gas is obtained having a hydrogen to carbon monoxide ratio of less than 1, and typically of the order of 0.6, while the inorganic components are fused and tapped from the bottom of the furnace.

Some of the other available waste disposal methods are described by Larry J. Ricci in an article entitled "Garbage Routes to Methane", Chemical Engineering (May 27, 1974), pages 58-60. The methods described therein are aneorobic digestion, hydrogasification and pyrolytic conversion of garbage and solid wastes to methane, a useful source of fuel energy.

Quite apart from the waste disposal problems, with the rapid depletion of natural gas reserves and the growing world-wide shortage of petroleum as a major source of fuel, attention has recently been focused on the prodigious coal reserves in the United States and there has been renewed interest in the gasification of coal as a source of fuel. The gasification of coal has been known for decades and, indeed, there are numerous such processes which are known in the art. See "Gas Generator Research and Development: Survey and Evaluation", published by Bituminous Coal Research, Inc. (1965).

Among the numerous known coal gasification processes there are four which represent the most advanced processes in this area. These are: the "Bi-Gas" process used for conversion of coal to substitute natural gas; the "HYGAS" process designed to convert coal of any rank or sulfur content to high-BTU gas interchangeable with natural gas; the "Lurgi" process for producing SNG from coal and the "Sunthane" process for production of SNG from any coal. See "Hydrocarbon Processing Handbook", Hydrocarbon Processing (May 1974), pages 122-125. These processes comprise the gasification of coal in a single converter to produce an off gas containing hydrogen and carbon monoxide. A water gas shift reaction is then carried out in a separate converter in order to adjust the ratio of hydrogen to carbon monoxide in the product gas.

So far as is known, there is no process which combines the pyrolysis of solid waste materials and the gasification of coal in a single reactor which is also adapted for carrying out the water gas shift reaction in order to selectively vary the ratio of hydrogen to carbon monoxide in the gaseous effluent from the reactor.

SUMMARY OF THE INVENTION

In accordance with this invention a mixture of coal and solid waste materials is introduced into a vertical reactor comprising a plurality of reaction zones, for effecting the coking of coal and the pyrolysis of the solid waste materials simultaneously. Thus, the process of this invention comprises:

a. feeding a mixture of coal and organic solid waste material to the top section (drying and preheating zone) of a vertical reactor, b. drying and preheating said mixture by countercurrent heat exchange with volatile products ascending from the higher temperature zones in the lower section of the reactor, c. introducing steam and an oxidant gas containing at least 75% oxygen to the partial combustion zone of the reactor, the ratio of steam to oxygen being so regulated that the temperature in this zone is maintained in the range of from about 2800° F. to about 3200° F., d. pyrolyzing the solid waste materials and simultaneously distilling the volatile components of the coal in a pyrolysis and coking zone wherein the coal and the solid waste materials are converted to coke and char, respectively, e. allowing the coke, char and the inorganic components of the solid waste materials to gravitate through a high temperature reaction zone to the partial combustion zone wherein the coke and char are reacted with oxygen and steam, the ratio of oxygen to carbon being controlled to maintain a reducing atmosphere and to minimize the production of carbon dioxide, while most of the inorganic components are fused as they encounter their respective melting temperatures, f. introducing secondary steam to the high temperature reaction zone and reacting said secondary steam with carbon monoxide ascending from the partial combustion zone, thereby producing hydrogen and carbon dioxide, the quantity of secondary steam being so regulated as to produce a preselected ratio of hydrogen to carbon monoxide in the product gas, g. discharging the fused slag and molten metals from the hearth at the bottom of the reactor, and h. removing the gaseous products from the reactor and subjecting the same to a product recovery system.

Thus, in one embodiment, the present invention contemplates the interaction and equilibration of a number of competing chemical reactions within a single reactor, under carefully controlled conditions, designed to convert coal and organic solid waste materials into a hydrogen-enriched synthesis gas containing predetermined ratios of hydrogen to carbon monoxide, depending on the ultimate use of the gaseous products. In another embodiment, this invention contemplates the conversion of coal and solid waste materials into a clean industrial fuel gas while avoiding the formation of noxious effluents and stack emissions normally associated with the incineration of municipal refuse.

These and other embodiments and objects of this invention will be more clearly comprehended from the following detailed description of the invention, taken in conjunction with the accompanying drawings.

THE DRAWINGS

FIG. 1 is a schematic flow representation of the process of this invention, including the product recovery section, illustrating one embodiment of this invention, FIG. 2 is a schematic, partly sectional representation of the reactor shown in FIG. 1, FIG. 3 is a plot showing the relationship between the amount of secondary steam and the ratio of hydrogen to carbon monoxide in the product gas, and FIG. 4 is another plot showing the relationship between the pressure in the reactor and composition of the gaseous effluent for one embodiment of this invention.

Like numerals in the drawings designate like parts.

DETAILED DESCRIPTION OF THE DRAWINGS

Figure 1:
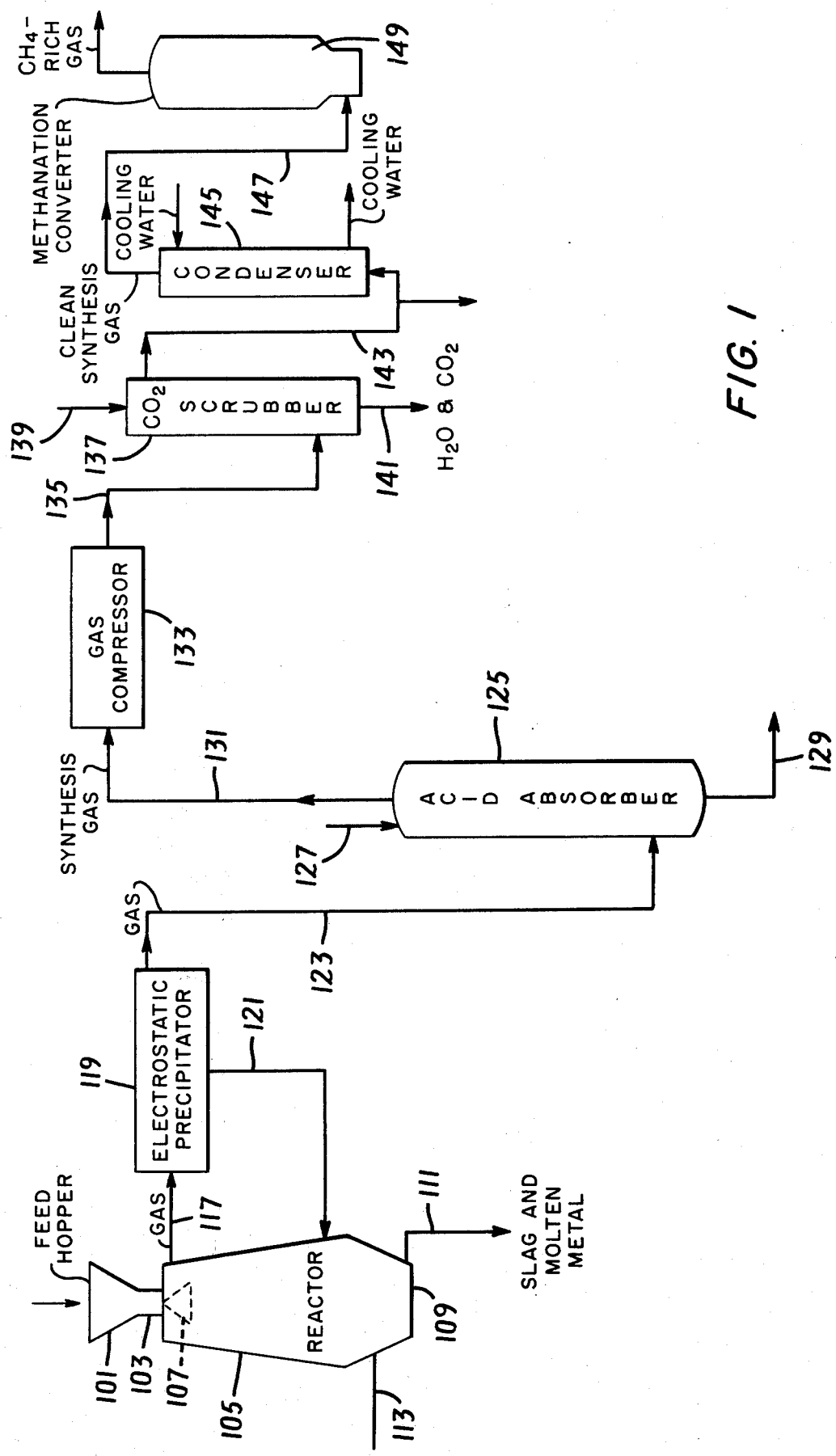

Referring to FIG. 1, a mixture of coal and solid waste material such as municipal solid waste (hereinafter "MSW") is fed from a feed hopper 101 through a charging lock 103 into a reactor 105. As was previously mentioned the reactor 105 may be a shaft furnace, a blast furnace, or any reactor of the general type and configuration usually employed for the gasification of coal.

While for the sake of simplicity the present invention is hereinafter described with a mixture of coal and MSW, it must be understood that the feed may be a mixture of any solid coal-like carbonaceous material such as subituminous coals (e.g., peat, lignite, or brown coal); bituminous coals, including the highly volatile and caking coals; anthracite coals; coke and charcoal, together with solid waste material containing a preponderance of organic components such as for example cellulosic matter, plastics, food waste, paper waste, saw dust, wood waste and other similar waste materials or refuse. Such solid waste materials will hereinafter sometimes be referred to as "organic solid waste" while the term "coal-like materials" will be employed to describe the above-mentioned solid carbonaceous materials.

The MSW may be fed to the feed hopper 101 in the form in which is usually received, or it may be coarse shredded to pass through a 12 inch $\times$ 12 inch screen, or more finely shredded to pass through a 2 inch $\times$ 2 inch screen, or even smaller. The coal which may be of various sizes and forms (e.g., pea, nut, egg, etc.) is thoroughly blended with the MSW in a mixer (not shown) upstream of the feed hopper 101 and transported therefrom by a conveyor (not shown) into the feed hopper 101. From there, the feed is introduced into the reactor 105 intermittently through a charging lock 103, or continuously by some other suitable mechanism such as, for example, a feed screw (not shown).

The ratio of coal to MSW in the feed can vary from about 0.25:1 to about 2.5:1, or even higher, but it is preferably from about 0.5:1 to about 1.5:1, depending on the types of coal-like materials and/or organic solid waste in the feed.

Upon entering the reactor 105, the feed flows downwardly under gravity and it first passes through the drying and preheating zone 105a. In continuous or semi-continuous operation, a distributor plate such as 107 near the top of the reactor provides more uniform distribution of the feed particles throughout the reactor.

The drying and preheating zone 105a is maintained at a temperature of from about 200° F. to about 500° F. at the upper part of this zone to a temperature of from about 600° F. to about 900° F. at the lower end thereof. The feed passing through this zone is dried and heated by countercurrent heat exchange with the ascending vapors emanating from the lower sections of the reactor 105 as will hereinafter be explained. The residence time in the drying and preheating zone 105a must be such as to insure substantially complete drying of the feed and heating the same to a temperature of about 600° F. to about 900° F. before entering the next zone in the reactor.

As the feed gravitates down through the reactor 105, it encounters increasingly higher temperatures. Thus upon leaving the drying and preheating zone 105a, the feed enters the pyrolysis and coking zone 105b where the temperature range is from about 600° F. to about 900° F. at the top to a temperature of from about 1600° F. to about 2000° F. at the lower end thereof. In this zone the volatile components of the coal are destructively distilled and pyrolyzed in the presence of hydrogen contained in the ascending gases, leaving a residual coke, while the MSW is pyrolyzed and converted into char. Since the coking of coal and the pyrolysis of MSW take place simultaneously in this zone, it will hereinafter sometimes be referred to as the simultaneous pyrolysis and coking zone. Operation in accordance with the process of this invention also offers a unique advantage in that during the simultaneous pyrolysis of MSW and coking of coal, the MSW serves to separate or encapsulate the coal particles which at times have a tendency to coalesce, thus making it possible to process caking coals that normally present great operating difficulty. During the downward gravitation of the charge through this zone, the endothermic pyrolysis and destructive distillation reactions are progressively completed, and the residual char and coke are heated to a temperature in the range of about 1600° F. to about 2000° F. as they enter the high temperature reaction zone 105c. In this zone the inorganic components of the MSW and the ash components of the coal are fused and liquefied as they reach their respective melting temperatures. The molten metal and slag flow downwardly through the reactor 105, and collect in a pool 109, from which they are tapped continuously or intermittently via tap line 111.

The thermal energy required for the pyrolysis of MSW and the coking of coal in zone 105b is provided by the hot gaseous products ascending from the high temperature reaction zone 105c and the partial combustion zone 105d. Thus both the coke and char from the pyrolysis and coking zone 105b gravitate downwardly through the high temperature reaction zone 105c to the partial combustion zone 105d, wherein they are reacted with oxygen and steam under carefully controlled reaction conditions.

Thus an oxygen-containing gas and steam are introduced into the partial combustion zone 105d through conduit 113 and uniformly distributed in this zone through a perforated tube or tuyeres 113a. The oxygen-containing gas and the steam may be introduced into the partial combustion zone 105d separately by separate conduits if desired.

The oxygen-containing gas desirably contains at least about 75 volume percent oxygen, but should preferably contain at least about 95 volume percent oxygen. Liquid air is a convenient source of oxygen and may be distilled to any desired oxygen concentration for this purpose. However, when liquid air is employed as the source of oxygen, it should preferably be distilled to an oxygen concentration of at least about 97 volume percent since otherwise the nitrogen present therein may enter into undesirable side reactions in the partial combustion zone 105d, thereby producing undesirable contaminants.

The high temperature reaction zone 105c is maintained at a temperature of from about 2000° F. to about 2800° F., and the partial combustion zone 105d is usually operated at a temperature between about 2800° F. to about 3200° F., preferably between about 2900° F. to about 3100° F. This temperature is controlled by balancing the exothermic heat of reaction of carbon and oxygen with the endothermic reaction of carbon and steam in this zone. The reaction of carbon and oxygen is exothermic and hence accompanied by the liberation of heat. The principal product of the reaction is carbon monoxide although some carbon dioxide is also produced. The reaction of carbon with steam, however, is endothermic and the principal reaction products are hydrogen and carbon monoxide. In accordance with this invention, these competing chemical reactions must be carefully balanced by controlling the ratio of oxygen to carbon as well as the ratio of oxygen to steam in this zone so that it can be maintained at the desired temperature level, while minimizing the formation of carbon dioxide. Thus, the process of this invention requires controlled interaction of the following chemical reactions, all of which occur to a predictable extent in the reactor, depending on the conditions employed therein:

$$C + O_2 \rightleftharpoons CO_2 \quad (1)$$

$$C + CO_2 \rightleftharpoons 2CO \quad (2)$$

$$C + H_2O \rightleftharpoons H_2 + CO \quad (3)$$

$$C + 2H_2 \rightleftharpoons CH_4 \quad (4)$$

$$CO + H_2O \rightleftharpoons H_2 + CO_2 \quad (5)$$

Reactions 3 and 5 are the well-known water gas reaction and the water gas shift reaction, respectively.

When the process of this invention is carried out at atmospheric or slightly superatmospheric pressure, reaction 4 is relatively insignificant for all practical purposes. However, if the process is carried out at substantial superatmospheric pressures, e.g., in the range of about 150 to 1500 p.s.i.g., reaction 4 contributes significantly in enriching the methane content of the gaseous effluent. The pressure in the reactor 105 may be atmospheric or superatmospheric depending on the desired composition of the gaseous effluent from the reactor and its ultimate use. Furthermore, additional steam may be introduced into the reactor as secondary steam, also depending on the ultimate utilization of the gaseous effluent. These different embodiments of the invention will now be described in further detail.

If the desired objective is to produce fuel gas, the process of this invention is carried out by maintaining the aforesaid zones in the reactor 105 at the temperatures hereinbefore described, and at atmospheric or slightly superatmospheric pressure. The optimum amounts of oxygen and steam in the partial combustion zone 105d will vary depending on the ratio of coal to MSW and, to some extent, on the presence of scavenging ingredients in the MSW, such as, for example, metallic aluminum. Table I below shows typical feed ratios of oxygen and steam for a range of coal to MSW when operating at atmospheric pressure and an MSW feed rate of approximately 1 ton per hour, using western coal and MSW as described hereinafter in connection with the description of another embodiment of this invention.

Table 1

| Ratio Coal/MSW | Carbon reaching partial combustion zone (ton/hr.) | Oxygen in oxidant gas (ton/hr.) | Primary steam (ton/hr.) |
|---|---|---|---|
| 0.25 | 0.364 | 0.240 | 0.389 |
| 0.50 | 0.496 | 0.323 | 0.528 |
| 1.0 | 0.760 | 0.493 | 0.806 |
| 1.5 | 1.018 | 0.664 | 1.085 |
| 2.5 | 1.540 | 1.004 | 1.640 |

The gaseous effluent leaves the reactor 105 at a temperature of from about 200° F. to about 500° F. These gaseous products are ordinarily first introduced into an electrostatic precipitator, as shown in FIG. 1, in order to remove any particulate matter and droplets of oil which may be present therein. The gaseous effluent from the electrostatic precipitator is then introduced into an acid absorber wherein the acid components of the gas (e.g., HCl and $H_2S$) are removed by scrubbing with water which may contain a neutralizing agent. The cleaned gases from the acid absorber are then introduced into a condenser in order to reduce the water concentration of the gas. The gaseous product (fuel gas) from the condenser is transported to a gas storage unit or to any other unit wherein it can be employed directly as a source of energy. The embodiment of the invention hereinbefore described is adapted for production of fuel gas which contains hydrogen and carbon monoxide in a ratio of about 1:1, or somewhat less.

Figure 2:
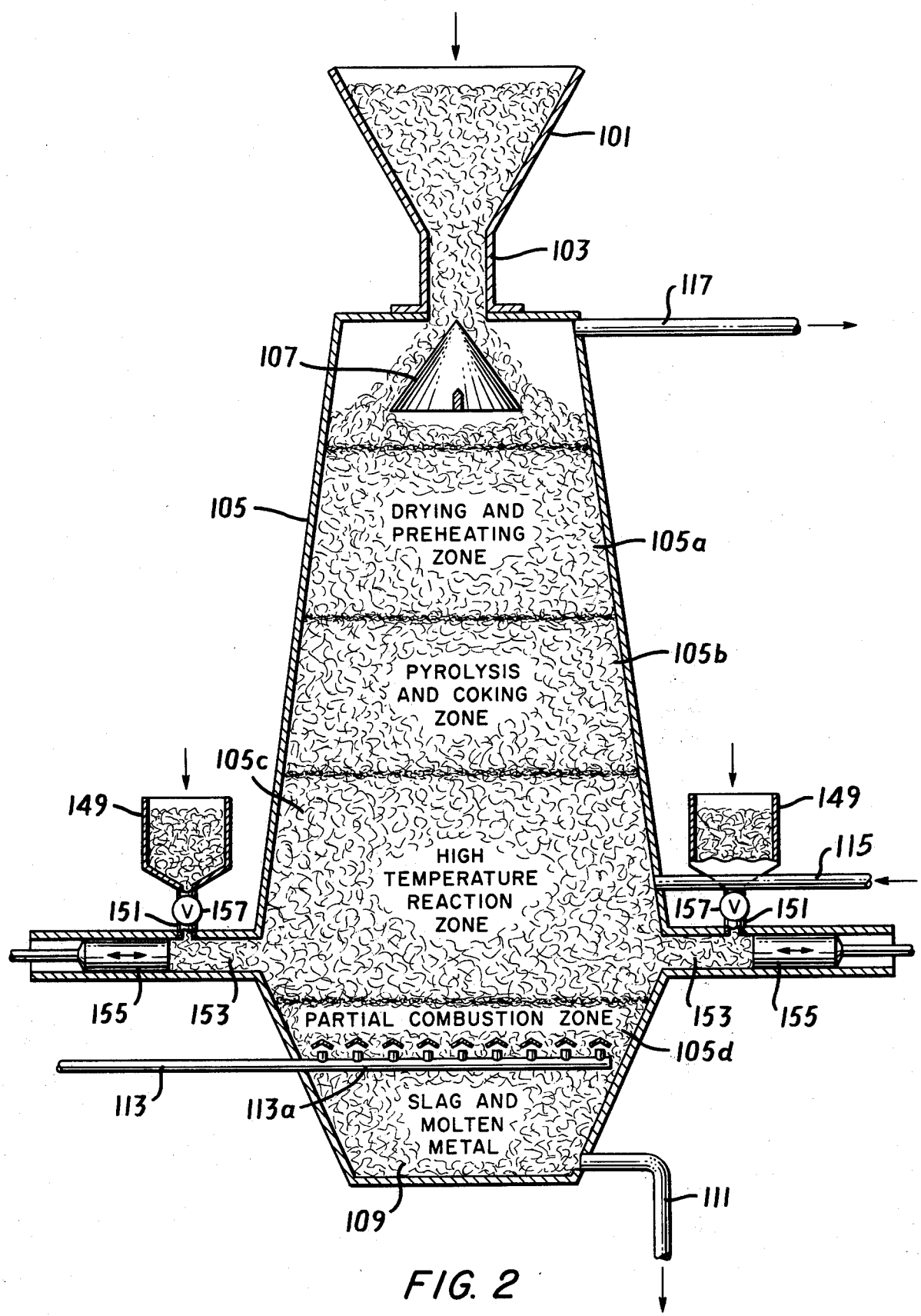

In another embodiment of this invention, the ratio of hydrogen to carbon monoxide in the product gas may be increased to about 2:1 (for synthesis of methanol) or about 3:1 (for synthesis of methane), or even higher. FIGS. 1 and 2 illustrate the embodiment of the invention suitable for the production of a product gas containing a hydrogen to carbon monoxide ratio of about 3:1 and, therefore, suitable for methane synthesis.

As in the previous embodiment, the mixture of coal and MSW is fed from the feed hopper 101 through the charging lock 103 into the reactor 105. The operation in the reactor and the conditions maintained therein are essentially the same as in the previous description with one notable difference, namely, the superimposition of the water gas shift reaction (reaction 5, supra) in the reactor. This is accomplished by the introduction of additional steam (hereinafter referred to as "secondary steam") via conduit 115 into the high temperature reaction zone 105c.

The rate of addition of the secondary steam to the reactor must be carefully controlled so that the gaseous effluent of the reactor contains the desired ratio of hydrogen to carbon monoxide. Table II shows the composition of the gaseous effluent leaving the reactor (on a wet basis) and of the product gas (on a dry basis) after reducing the carbon dioxide concentration to about 2% by scrubbing in a high-pressure water scrubber, for example, and removing water vapor in a condensor. The compositions given in this table are illustrative of secondary steam addition to the converter, expressed in tons of secondary steam per hour. The reported compositions apply to a 1:1 mixture of coal to MSW, fed at the rate of 2 tons per hour. The coal is a typical western coal containing 35% volatiles and 10% ash, and the MSW employed has the following composition:

| Components of MSW | Weight %, as received | Weight %, dry basis |
|---|---|---|
| Paper | | |
| Newsprint | 9.0 | 12.0 |
| Cardboard | 8.3 | 11.0 |
| Other | 24.0 | 32.0 |
| Food Waste | 10.5 | 14.0 |
| Yard Waste | 3.8 | 5.0 |
| Wood | 3.0 | 4.0 |
| Plastics | 1.0 | 1.3 |
| Glass | 6.8 | 9.0 |
| Metals | | |
| Ferrous | 5.6 | 7.5 |
| Nonferrous | 1.1 | 1.5 |
| Misc. | 1.9 | 2.7 |
| Water | 25.0 | 0 |
| Total | 100.0 | 100.0 |

Table II

| Secondary steam tons/hr. | Composition of Reactor Effluent (%. wet basis) | | | | | | Composition of Product Gases (%, dry basis) | | | | | Ratio H$_2$:CO |
|---|---|---|---|---|---|---|---|---|---|---|---|---|
| | H$_2$ | CO | CO$_2$ | CH$_4$ | C$_x$H$_y$$^{(1)}$ | H$_2$O | H$_2$ | CO | CO$_2$ | CH$_4$ | C$_x$H$_y$$^{(1)}$ | |
| 0 | | | | | | | 41 | 51 | 2 | 4 | 2 | 0.8:1 |
| 0.17 | 36.5 | 36 | 12 | 3 | 1.5 | 11 | 46 | 46 | 2 | 4 | 2 | 1:1 |
| 0.72 | 42 | 20 | 21 | 3 | 1 | 13 | 62 | 30 | 2 | 4 | 2 | 2.1:1 |
| 0.95 | 43 | 14 | 24 | 2 | 1 | 16 | 69 | 23 | 2 | 4 | 2 | 3:1 |

$^{(1)}$miscellaneous hydrocarbons

The data in Table II reflect a steam conversion due to the water gas shift reaction of about 65%. The steam conversion may vary, however, from 50% to about 90%, depending on the temperature profile in the reactor, which, in turn varies with the geometry of the reactor, the composition of the charge, and its rate of throughput.

Figure 3:
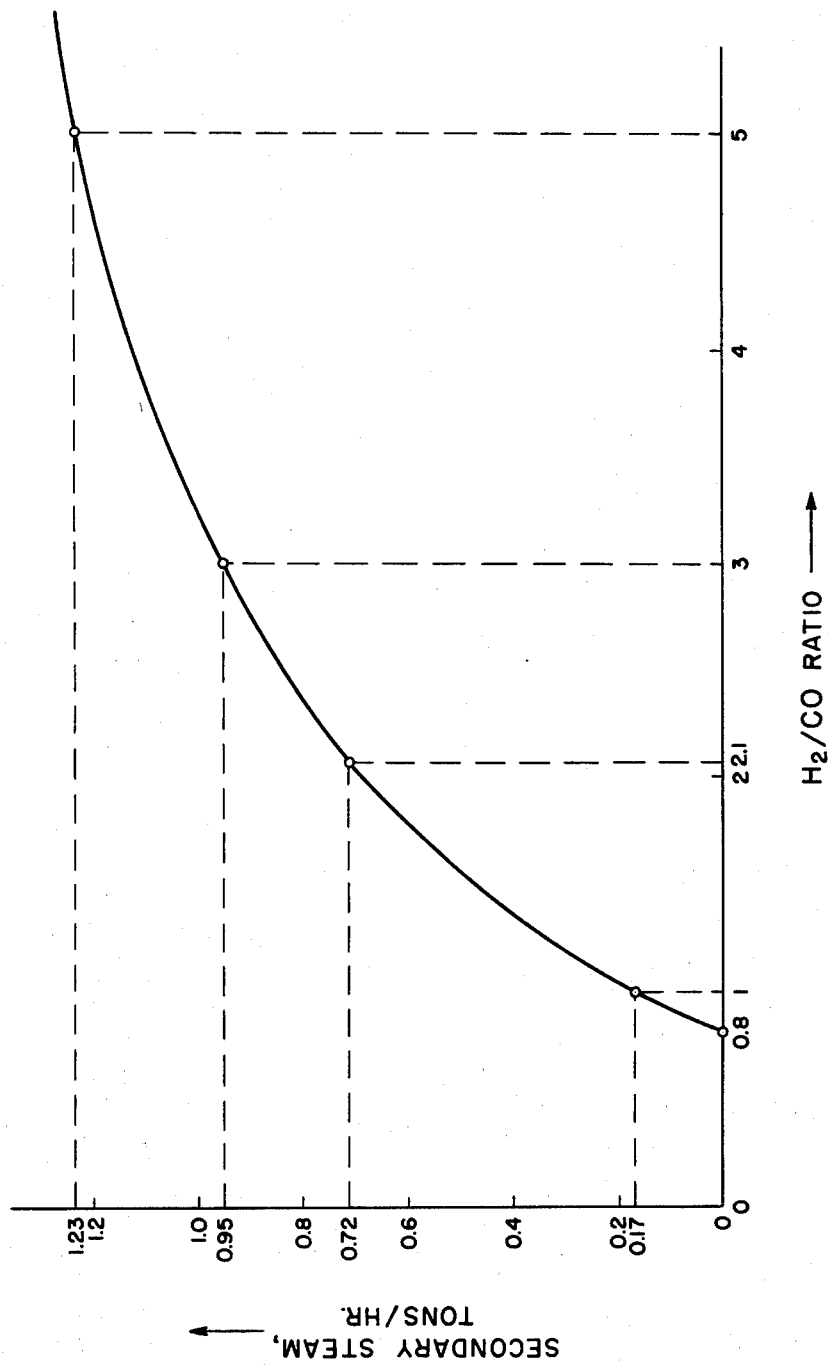

FIG. 3 is a graphic illustration of the variation in the ratio of hydrogen to carbon monoxide at different rates of secondary steam addition when operating the reactor at atmospheric pressure. The data for this plot are taken from Table I. As FIG. 3 indicates, when no secondary steam is added, or when the amount of secondary steam is relatively small, the ratio of hydrogen to carbon monoxide in the product gas is nearly 1:1, or somewhat less. Only when significant amounts of secondary steam are introduced as hereinbefore described, is the ratio of hydrogen to carbon monoxide in the product gas substantially increased.

The gaseous effluent of the reactor is subjected to a product recovery system as follows: it is conducted via gas line 117 into an electrostatic precipitator 119 wherein the particulate matter and droplets of oil are removed and returned to the reactor 105 via line 121, if desired. The gaseous effluent from the electrostatic precipitator 119 is transported by conduit 123 into an acid absorber 125 wherein the acid contaminants in the gas (e.g., HCl and H$_2$S) are removed by scrubbing with a neutralizing agent such as lime water which is introduced into the acid absorber 125 through lime water line 127, and the absorber bottoms may be discharged through absorber bottom line 129. The cleaned gas from the acid absorber 125 is transported by conduit 131 and compressed in a compressor 133 to elevated pressures of up to about 1000 p.s.i.g., as necessary, and the compressed gas is then conducted through line 135 into a high pressure carbon dioxide scrubber 137 wherein the carbon dioxide level of the gas is reduced by scrubbing with water which is introduced therein via conduit 139. Water containing carbon dioxide is discharged from the scrubber 137 through discharge line 141. The gas from the carbon dioxide absorber 137 is then transported by conduit 143 to a condenser 145 where the water is condensed under full system pressure and the gaseous effluent of the condenser 145 is then transported through line 147 to a high-pressure methanation converter 149.

In either embodiment, depending on the nature of the carbonaceous fuel employed, certain high-boiling coal tars are distilled from the coal in the pyrolysis and coking zone. These are normally cracked or subjected to hydrogenolysis by contact with the hot combustion products ascending from the high temperature reaction zone. To the extent that they are carried into the cooler, preheating and drying zone of the reactor, they are condensed on the descending charge and thus refluxed to the pryrolysis and coking zone for additional pyrolysis. Occasionally, the tar coated components of the charge may tend to bridge and thus cause undesirable channeling within the reactor. This may be avoided by introducing tar-rich or caking-coals directly to the high temperature reaction zone of the converter where thr released tars are rapidly gasified. Non-bridging, non-channeling operation may also be assured by ram-injection of secondary coal to the high temperature reaction zone to intermittently perturbe the structure of the descending charge as hereinafter more particularly described.

Thus the reactor 105 may be conveniently provided with four secondary coal feed hoppers 149 circumferentially disposed equidistantly around the reactor. Two such secondary coal feed hoppers are shown in FIG. 2 for simplicity of illustration. Each secondary coal feed hopper 149 communicates through conduit 151 with a tubular member 153 which includes a ram means 155 which may be actuated intermittently by a suitable electrical or mechanical means (not shown) in order to cause forward motion of the ram means toward the reactor. Conduit 155 also includes a valve 157 for dispensing the coal from the feed hopper 149 into the tubular member 153 as shown in FIG. 2.

The ram injection means may be operated when bridging or channeling are detected or suspected (as, for example, by hot-spot formation or erratic changes in the temperature of the effluent gas stream or its composition). In operation, the valve 157 is opened to dispense a desired quantity of the secondary coal into the tubular member 153. The ram means 155 is then biased forwardly in order to inject the secondary coal into the reactor. The impact resulting from the ram injection of the secondary coal disturbs the bed in the reactor and dislodges and breaks up any bridges therein.

The operation of the ram means 155 may be synchronized so that each two opposite ram operate simultaneously. For example, the ram means situated at the north and south positions relative to the reactor 105 may be biased forward simultaneously, while the east-west situated rams are in their normal retracted positions. When the north-south rams, however, are retracted to their original positions, the east-west rams are biased forwardly to inject the secondary coal into the reactor 105.

In order to insure efficient injection of the secondary coal into the reactor 105, the ram means may be a cylindrical member (such as a piston) having an outside diameter nearly equal the inside diameter of the tubular member 153 so as to define an extremely narrow clearance therewith. This clearance will ordinarily be tightly packed by the secondary coal during the forward motion of the ram thereby causing an effective seal which will insure efficient ram injection of the secondary coal into the reactor 105.

Ram injection is also advantageous when feeding a mixture of finely shredded organic solid waste and coal-like material. In this case, substantially all, or part of the feed mixture is introduced to the top of the reactor by means of a ram injection device as hereinbefore described in connection with the addition of secondary coal to the high temperature reaction zone.

As was previously stated, the process of this invention may be carried out at atmospheric or superatmospheric pressures. If the desired objective is to produce synthesis gas (such as, for example, for making methanol), or to make a product gas containing only a small amount of methane, the reactor 105 may be maintained at atmospheric or slightly superatmospheric pressures. However, if it is desired to produce a product gas which contains significantly larger amounts of methane, then the reactor 105 must be maintained at elevated pressure of from about 150 p.s.i.g. to about 1500 p.s.i.g. The remaining conditions in the reactor are otherwise essentially the same as hereinbefore described in connection with the previous embodiments of this invention.

Thus when the reactor is operated at such elevated pressures during the process of this invention, reaction 4, supra, becomes a more significant factor in the high temperature reaction zone 105c as well as in the pyrolysis and coking zone 105b, thereby producing more methane in the reactor. Consequently the gaseous effluent of the reactor will be richer in methane.

The product recovery section for this embodiment of the invention is essentially as hereinbefore described in connection with FIG. 1. However, it is obvious to those skilled in the art that slight modifications in the product recovery section may be necessary for this embodiment of the invention.

Figure 4:
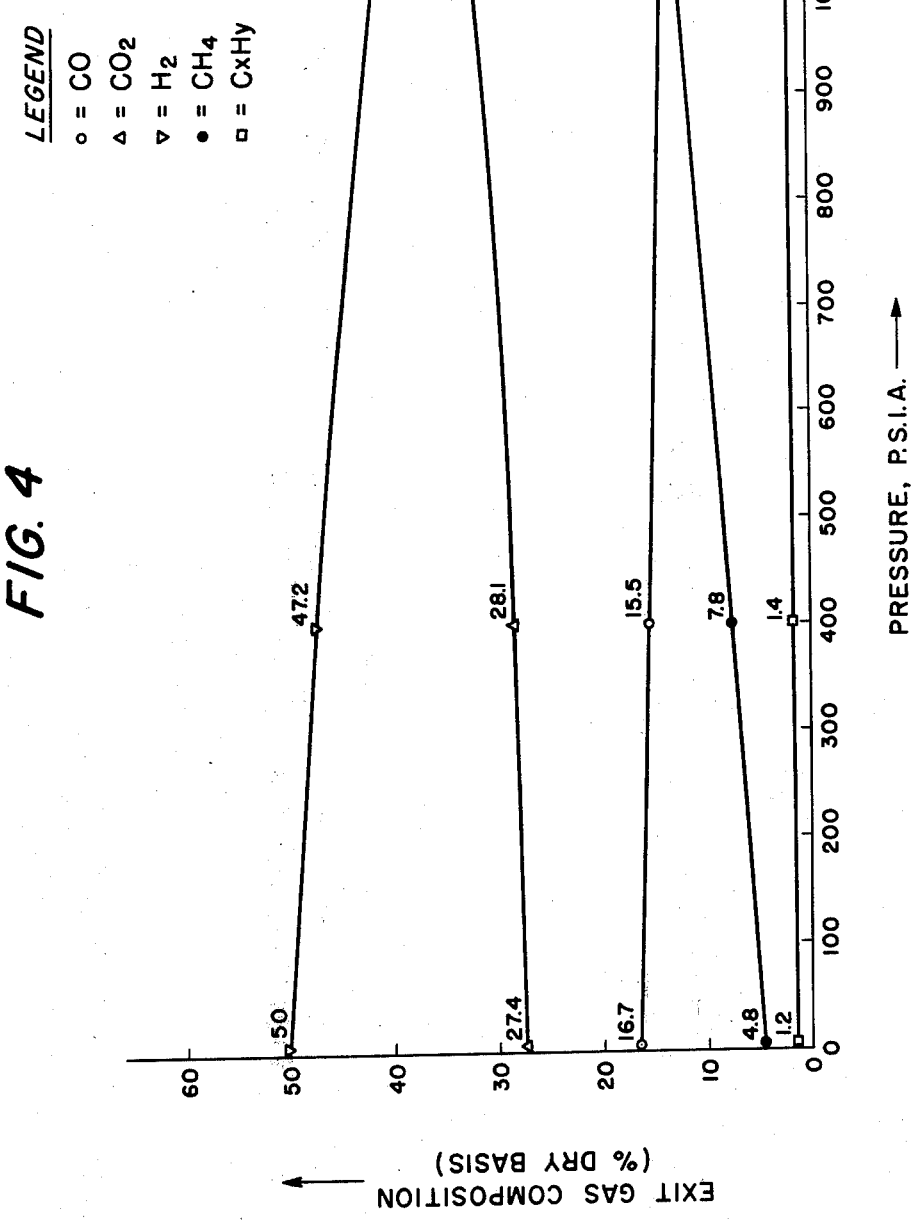

FIG. 4 illustrates the change in composition of the product gas at different pressures for a typical operation using, once again, western coal and MSW having the characteristics hereinbefore described, a coal to MSW ratio of about 1:1, and wherein the hydrogen to carbon monoxide ratio in the gaseous effluent of the reactor is about 3:1 and the steam conversion is approximately 63%. Obviously, the values in FIG. 4 may be somewhat different for different ratios of hydrogen to carbon monoxide and different levels of steam conversion.

It must also be mentioned that the composition of the product gas will also vary depending upon the amount of secondary steam which is introduced into the reactor as hereinbefore described. Table III illustrates the changes in the composition of the product gas with different amounts of secondary steam at different reactor operating pressures.

The data in Table III are also based on feeding 1 ton per hour of western coal and 1 ton per hour of MSW having the characteristics hereinbefore described, and a steam conversion of approximately 65%.

Table III

| Operating pressure (psia) | Secondary steam tons/hr. | Composition of Exit Gas (%, wet basis) | | | | | | Composition of Product Gas[2] (%, dry basis) | | | | | Ratio |
|---|---|---|---|---|---|---|---|---|---|---|---|---|---|
| | | $H_2$ | CO | $CO_2$ | $CH_4$ | $C_xH_y^{(1)}$ | $H_2O$ | $H_2$ | CO | $CO_2$ | $CH_4$ | $C_xH_y^{(1)}$ | $H_2:CO$ |
| 15 | 0 | 35 | 39 | 10 | 5 | 1.5 | 9.5 | 42.6 | 47.5 | 2 | 6.1 | 1.8 | 0.9/1 |
| 15 | 0.081 | 35.8 | 35.8 | 11.6 | 5 | 1.5 | 10.3 | 45 | 45 | 2 | 6.3 | 1.7 | 1/1 |
| 15 | 0.606 | 40.6 | 19.3 | 20.3 | 4.2 | 1.2 | 14.4 | 61 | 29 | 2 | 6.3 | 1.7 | 2/1 |
| 15 | 0.8215 | 42 | 14 | 23 | 4 | 1 | 16 | 67.4 | 22.5 | 2 | 6 | 2.1 | 3/1 |
| 400 | 0 | 31 | 38.5 | 10 | 9 | 1.5 | 10 | 37.9 | 47.2 | 2 | 11 | 1.9 | 0.8/1 |
| 400 | 0.154 | 33 | 32.5 | 13 | 8 | 1.5 | 12 | 43 | 42 | 2 | 11 | 2 | 1/1 |
| 400 | 0.616 | 38 | 18 | 21 | 7 | 1 | 15 | 57.8 | 27.2 | 2 | 11 | 2 | 2/1 |
| 400 | 0.808 | 39.5 | 13 | 23.5 | 6.5 | 1.2 | 16.3 | 64 | 21 | 2 | 11 | 2 | 3/1 |
| 1000 | 0 | 21.3 | 41 | 10.4 | 14 | 2 | 11.3 | 26.6 | 51.2 | 2 | 17.6 | 2.5 | 0.5/1 |
| 1000 | 0.33 | 27 | 27 | 17.5 | 12 | 1.5 | 15 | 39.2 | 39.1 | 2 | 17.4 | 2.3 | 1/1 |
| 1000 | 0.695 | 32 | 15.2 | 23.2 | 10.5 | 1.4 | 17.3 | 53 | 25.3 | 2 | 17.4 | 2.3 | 2/1 |
| 1000 | 0.845 | 33.6 | 11.2 | 25.7 | 10 | 1.3 | 18.2 | 58.7 | 19.6 | 2 | 17.4 | 2.3 | 3/1 |

[1] miscellaneous hydrocarbons
[2] scrubbed to 2% $CO_2$

While the foregoing invention and its various embodiments have heretofore been sometimes described with certain degrees of particularity, it will be understood that various changes and modifications may be made both in the operation of the reactor as well as the product recovery system, which changes and modifications are nevertheless within the scope of this invention. It must be further understood that while the operation of the reactor 105 has heretofore been described with reference to several zones, the boundaries of said zones are not necessarily sharply defined or definable but, in fact, they tend to overlap to some extent depending, inter alia, upon the compositions of the organic solid waste, the coal-like material, their relative ratio in the feed, the feed rate and the amount of secondary steam which is introduced into the reactor.

What is claimed is:

1. A process for the production of gaseous effluent rich in hydrogen and carbon monoxide from a feed mixture of coal-like material and organic solid waste, which process is carried out in a vertical reaction zone comprising, successively, a preheating and drying zone in the top portion thereof, a pyrolysis and coking zone, a high temperature reaction zone, and a partial combustion zone, which process comprises the steps of:
   a. thoroughly blending said coal-like material and said organic solid waste in a ratio of 0.25 to about 2.5 parts of coal-like material to one part of organic solid waste;
   b. introducing said thoroughly blended mixture of coal-like material and organic solid waste to the top section of said vertical reaction zone and allowing said mixture to flow downwardly through said preheating and drying zone while maintaining said preheating and drying zone at a temperature of from about 200° F. to about 500° F. at the upper end thereof and a temperature of from about 600° F. to about 900° F. at the lower end thereof;
   c. allowing the preheated and dried mixture of said coal-like material and said organic solid waste to flow downwardly into said pyrolysis and coking zone wherein said mixture is directly contacted with hot gaseous products comprising hydrogen and carbon monoxide rising from the partial combustion zone through the high temperature reaction zone thereby causing the destructive distillation of said coal-like material and the simultaneous pyrolysis of said organic solid waste to carbonaceous products comprising coke and char, said pyrolysis and coking zone being maintained at a temperature of from about 600° F. to about 900° F. at the upper end thereof and a temperature of about 1600° F. to about 2000° F. at the lower end thereof;
   d. allowing said carbonaceous products from said pyrolysis and coking zone to flow successively downward through said high temperature reaction zone and said partial combustion zone;
   e. maintaining said high temperature reaction zone at a temperature of from about 2000° F. to about 2800° F.;
   f. introducing into said partial combustion zone an oxidant gas containing at least about 75 percent by volume of oxygen to effect the partial combustion of a portion of said carbonaceous products thereby producing carbon monoxide and minimum amounts of carbon dioxide, the total quantity of said oxidant gas utilized in said vertical reaction zone being introduced into said partial combustion zone;
   g. introducing steam to said partial combustion zone to react with a remaining portion of said carbonaceous products thereby producing hydrogen and carbon monoxide;
   h. controlling the amounts of steam and oxidant gas introduced into said partial combustion zone to balance the exothermic heat of reaction of said oxygen and said carbonaceous products with the endothermic heat of reaction of said steam and said carbonaceous products while maintaining said partial combustion zone at a temperature of about 2800° F. to about 3200° F.;
   i. removing from the upper portion of the vertical reaction zone gaseous effluent containing hydrogen and carbon monoxide in a ratio enriched by introducing controlled amounts of additional steam into the high temperature reaction zone while maintaining the temperature of said zone in the range of from about 2000° F. to about 2800° F; and
   j. withdrawing fused slag from the lower portion of the vertical reaction zone.

2. The process of claim 1 wherein the ratio of said coal-like material to said organic solid waste is from about 0.5:1 to about 1.5:1.

3. The process of claim 2 wherein said organic solid waste is selected from the group consisting of municipal solid waste, argricultural refuse, cellulosic matter, food waste, paper waste, sawdust and wood waste.

4. The process of claim 2 wherein said coal-like material is bituminous coal and wherein said organic solid waste is municipal solid waste.

5. The process of claim 3 wherein said coal-like material is a caking coal and wherein said organic solid waste serves to encapsulate said caking coal.

6. The process of claim 5 wherein said thoroughly blended feed mixture is introduced into the vertical reaction zone by ram injection to the top of the said zone.

7. The process of claim 6 wherein said feed mixtureis in the form of finely shredded organic solid waste and coal-like material.

8. The process of claim 7 wherein additional coal-like material is introduced into the high temperature reaction zone to prevent channeling and bridging.

9. The process of claim 8 wherein said additional coal-like material is a tar-rich or caking coal.

* * * * *